United States Patent
Namiki et al.

(10) Patent No.: US 10,313,830 B2
(45) Date of Patent: Jun. 4, 2019

(54) INFORMATION PROCESSING DEVICE, INFORMATION PROCESSING METHOD, AND NON-TRANSITORY COMPUTER READABLE STORAGE MEDIUM

(71) Applicant: YAHOO JAPAN CORPORATION, Tokyo (JP)

(72) Inventors: Ryota Namiki, Tokyo (JP); Kota Tsubouchi, Tokyo (JP); Yoshimitsu Sakui, Tokyo (JP)

(73) Assignee: YAHOO JAPAN COPRPORATION, Tokyo (JP)

( * ) Notice: Subject to any disclaimer, the term of this patent is extended or adjusted under 35 U.S.C. 154(b) by 0 days.

(21) Appl. No.: 16/031,010

(22) Filed: Jul. 10, 2018

(65) Prior Publication Data

US 2019/0028833 A1 Jan. 24, 2019

(30) Foreign Application Priority Data

Jul. 18, 2017 (JP) .................. 2017-139223

(51) Int. Cl.
*H04W 4/02* (2018.01)
*H04W 4/021* (2018.01)

(52) U.S. Cl.
CPC ........... *H04W 4/021* (2013.01); *H04W 4/027* (2013.01)

(58) Field of Classification Search
CPC ...... G06F 12/02; G06C 21/26; G08G 1/0969; G08G 1/112; G06K 9/6215; G06K 9/6276; H04W 4/029; H04W 4/021; H04W 4/027; G01S 19/40
See application file for complete search history.

(56) References Cited

U.S. PATENT DOCUMENTS

2013/0173879 A1* 7/2013 Suzuki .................... G06F 12/02
711/165

FOREIGN PATENT DOCUMENTS

| JP | 2013-140425 A | 7/2013 |
| JP | 2016-099313 A | 5/2016 |

OTHER PUBLICATIONS

Nov. 16, 2017 Office Action issued in Japanese Patent Application No. 2017-139223.

* cited by examiner

*Primary Examiner* — Nizar N Sivji
(74) *Attorney, Agent, or Firm* — Oliff PLC

(57) ABSTRACT

An information processing device according to the present application includes an acquisition unit and a determination unit. The acquisition unit acquires time-series position information acquired by a terminal device. The determination unit determines whether relation between one or more pieces of interest position information included in the time-series position information acquired by the acquisition unit and prior or posterior position information in time series satisfies a predetermined criterion, and determines whether to hold the interest position information based on a determination result.

22 Claims, 9 Drawing Sheets

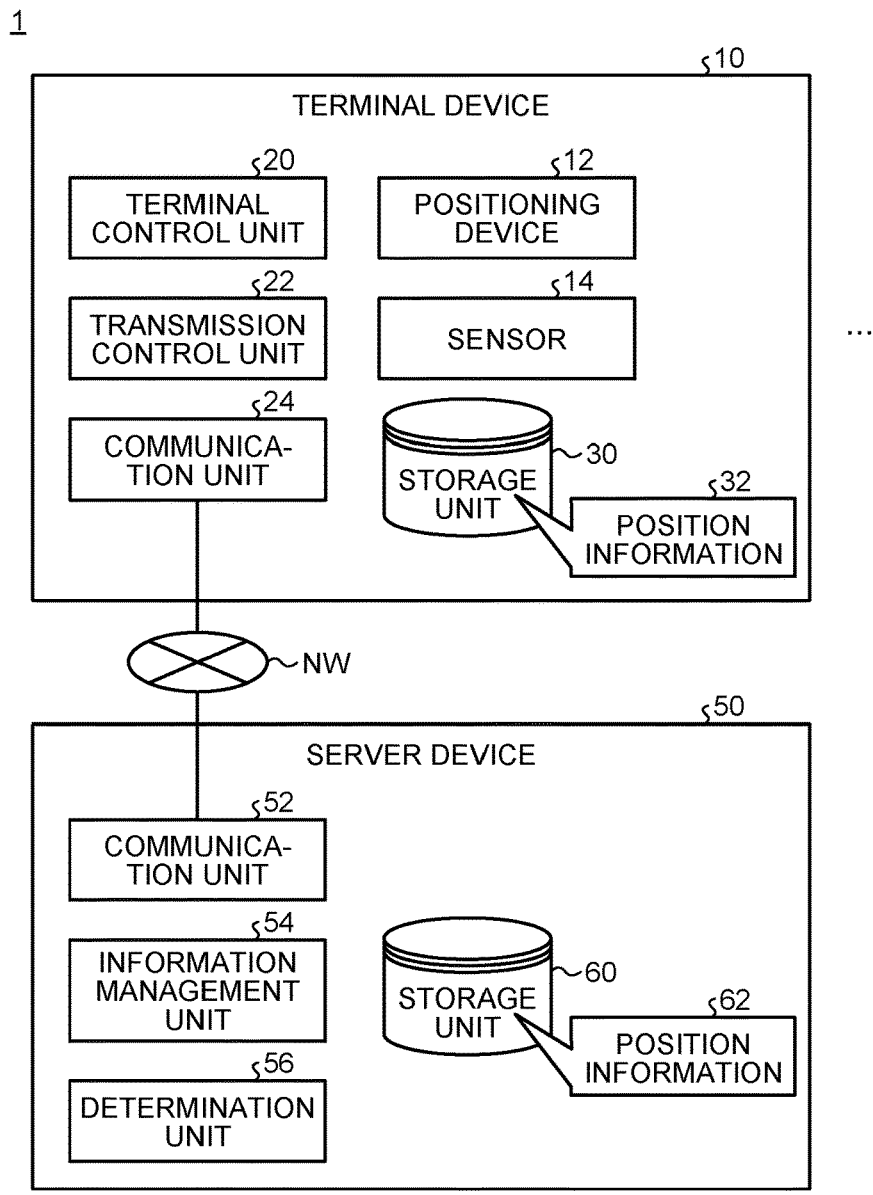

PROCESSING TARGET OF FIRST ROUTINE

| POSITION ID | 1 | 2 | 3 | 4 | 5 | ... | 100 |
|---|---|---|---|---|---|---|---|
| TIME | t | t+1 | t+2 | t+3 | t+8 | ... | t+n |
| POSITION INFORMATION | X1, Y1 | X1, Y3 | X1, Y4 | X1, Y7 | X1, Y7 | ... | X5, Y80 |

⇩ DETERMINED NOT TO HOLD POSITIONINFORMATION ID 2

PROCESSING TARGET OF SECOND ROUTINE

| POSITION ID | 1 | 3 | 4 | 5 | ... | 100 |
|---|---|---|---|---|---|---|
| TIME | t | t+2 | t+3 | t+8 | ... | t+n |
| POSITION INFORMATION | X1, Y1 | X1, Y4 | X1, Y7 | X1, Y7 | ... | X5, Y80 |

⇩ DETERMINED NOT TO HOLD POSITIONINFORMATION ID 3

PROCESSING TARGET OF THIRD ROUTINE

| POSITION ID | 1 | 4 | 5 | ... | 100 |
|---|---|---|---|---|---|
| TIME | t | t+3 | t+8 | ... | t+n |
| POSITION INFORMATION | X1, Y1 | X1, Y7 | X1, Y7 | ... | X5, Y80 |

⇩ DETERMINED NOT TO HOLD POSITIONINFORMATION ID 5

POSITION INFORMATION TO BE HELD IN END

| POSITION ID | 1 | 4 | ... | 100 |
|---|---|---|---|---|
| TIME | t | t+3 | ... | t+n |
| POSITION INFORMATION | X1, Y1 | X1, Y7 | ... | X5, Y80 |

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2017-139223 filed in Japan on Jul. 18, 2017.

BACKGROUND OF THE INVENTION

1. Field of the Invention

This disclosure relates to an information processing device, an information processing method, and a non-transitory computer readable storage medium.

2. Description of the Related Art

Conventionally, a device that acquires traveling locus information in which positions of a moving body in the moving direction and wireless communication state at each of the positions are associated, and reference locus information that is traveling locus information on the moving body or the other moving body having traveled in the past and that includes a characteristic point the absolute position of which is known has been disclosed (for example, see Japanese Laid-open Patent Publication No. 2016-99313). Even when the traveling locus information is deviated from the reference locus information, the device can reduce the deviation by performing filtering set in advance according to the deviation or the factor of the deviation, on at least one of the traveling locus information and the reference locus information.

However, in the conventional technology described above, it is not possible to properly sort the position information.

SUMMARY OF THE INVENTION

According to one innovative aspect of the subject matter described in this disclosure, an information processing device includes: (i) an acquisition unit that acquires time-series position information acquired by a terminal device, and (ii) a determination unit that determines whether relation between one or more pieces of interest position information included in the time-series position information acquired by the acquisition unit and prior or posterior position information in time series satisfies a predetermined criterion, and determines whether to hold the interest position information based on a determination result.

BRIEF DESCRIPTION OF THE DRAWINGS

FIG. 1 is a diagram illustrating a configuration of an information processing system 1;

FIG. 2 is a diagram illustrating the contents of position information 32 stored in a storage unit 30;

FIG. 7 is a diagram illustrating an example of the contents of position information when a process of the first to third routines is performed on position information at position IDs 1 to N;

DETAILED DESCRIPTION OF THE PREFERRED EMBODIMENTS

Figure 3:
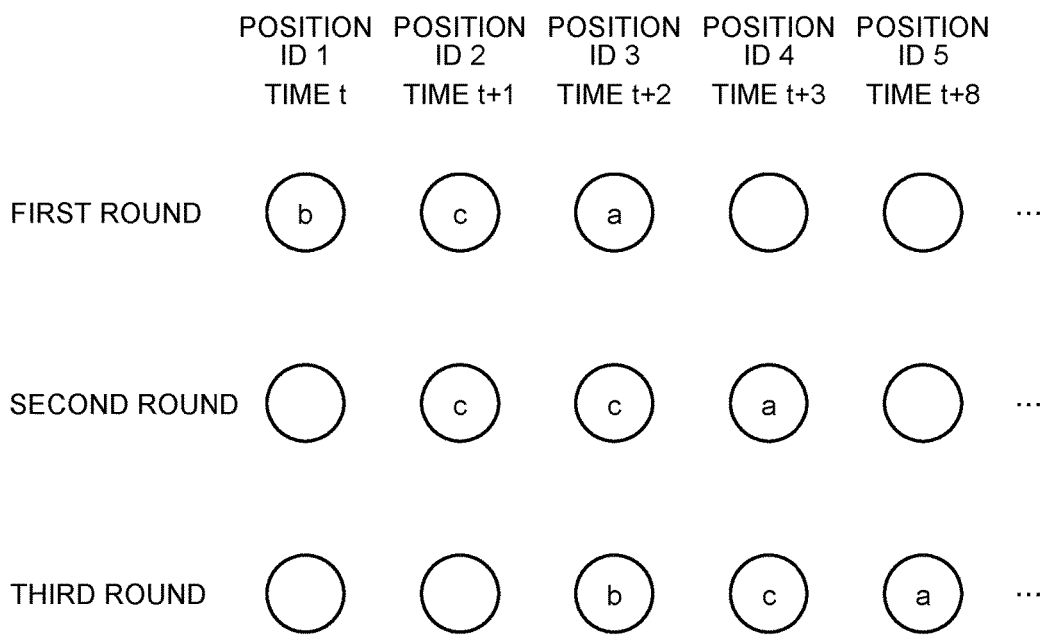
FIG. 3 is a diagram for explaining a process performed by a determination unit 56 (first example)

Hereinafter, embodiments of an information processing device, an information processing method, and a computer readable storage medium of the present invention will be described in detail with reference to the accompanying drawings. The information processing device is implemented by one or more processors. The information processing device acquires time-series position information from a terminal device, determines whether relation between each piece of position information included in the time-series position information and the prior or posterior position information in time series satisfies a predetermined criterion, and determines whether to hold the position information on the basis of the determination result.

For example, holding the position information means to leave the position information in a storage unit that is managed or accessed by the information processing device. For example, the time-series position information may or may not be kept at temporally regular intervals.

The information processing device can properly sort the position information by holding the position information that satisfies the predetermined criterion instead of by holding the position information that does not satisfy the predetermined criterion. Hereinafter, the information processing device will be described.

1. First Embodiment

In a first embodiment, the predetermined criterion is a criterion indicating that the position information is meaningful between the prior and posterior position information. For example, the predetermined criterion includes at least one of a criterion on a time interval between the interest position information and the prior or posterior position information in time series, a criterion on a distance between the interest position information and the prior or posterior position information, a criterion on moving speed based on the time interval and the distance between the interest position information and the prior or posterior position information, and a criterion on an angle between a moving direction toward the interest position information included in the time-series position information and a moving direction from the interest position information.

1-1. Configuration of Information Processing System

FIG. 1 is a diagram illustrating a configuration of an information processing system 1 including a terminal device 10 and a server device 50 (an example of information processing device). For example, the information processing system 1 includes one or more of the terminal devices 10 and the server device 50. These components communicate with each other via a network NW. For example, the network NW includes a wide area network (WAN), a local area network (LAN), the Internet, a dedicated circuit, a radio base station, a provider, and the like.

1-2. Configuration of Terminal Device

For example, the terminal device 10 is a portable device such as a cellular phone like a smartphone and a tablet terminal. For example, the terminal device 10 includes a positioning device 12, a sensor 14, a terminal control unit 20, a transmission control unit 22, a communication unit 24, and a storage unit 30. The terminal control unit 20 and the transmission control unit 22 are implemented when a hardware processor such as a central processing unit (CPU) executes a computer program (software) stored in the storage unit 30. These functional units may also be implemented by hardware such as a large scale integrated circuit (LSI), an application specific integrated circuit (ASIC), a field-programmable gate array (FPGA), and a graphics processing unit (GPU). Software and hardware (including circuitry) may also implement the functional units in cooperation. For example, the storage unit 30 is implemented by a hard disk drive (HDD), a flash memory, a random access memory (RAM), and the like.

The positioning device 12 includes a global positioning system (GPS) receiver. The positioning device 12 specifies the position of the terminal device 10 (in other words, the position of the user) by performing positioning based on radio waves the GPS receiver has received from the satellites. The terminal device 10 may also estimate the position of the terminal device 10 from the position of the radio base station connected to the communication unit 24.

Examples of the sensor 14 include a triaxial accelerometer, a gyro sensor, a magnetic field sensor, and the like.

For example, the terminal control unit 20 estimates the moving state of the terminal device 10 on the basis of information acquired by the sensor 14. The terminal control unit 20 causes the positioning device 12 to acquire position information on the terminal device 10 according to the moving state of the terminal device 10. For example, the terminal control unit 20 causes the positioning device 12 to acquire position information when the terminal device 10 is moving, and does not cause the positioning device 12 to acquire position information when the terminal device 10 is not moving. Consequently, position information on the terminal device 10 staying at a position within a predetermined range will not be acquired.

More specifically, the terminal control unit 20 may cause the positioning device 12 to acquire position information at a predetermined time interval, determine whether the last measured position and the currently measured position are separated for a predetermined distance or more, and when the last measured position and the currently measured position are separated for a predetermined distance or more, determine to store the position information in the storage unit 30. However, it is not limited thereto, and the terminal control unit 20 may store the position information measured at each predetermined time interval in the storage unit 30, regardless of the moving state of the terminal device 10.

FIG. 2 is a diagram illustrating the contents of position information 32 stored in the storage unit 30. As illustrated in FIG. 2, the position information is stored in the storage unit 30 with a predetermined time (for example "+1") set as the shortest interval. It is to be noted that a particular unit is not mapped to a numeral 1, and the numeral indicates the time for convenience sake. In the above, the position information is not stored when the terminal device 10 is not moving. However, when the time interval from the last measured time is long enough (for example, when time interval is "+5" or more), the position information may be stored in the storage unit 30. In FIG. 2, the position information acquired at the time t+8 is the same as the position information acquired at the time t+3, but because the time interval between the time t+3 and the time t+8 is long enough, the position information acquired at the time t+8 is held. In FIG. 2, a position ID is identification information assigned to the position information.

For example, the transmission control unit 22 sends the position information stored in the storage unit 30 to the server device 50 using the communication unit 24, when predetermined pieces of the position information are accumulated, or at every predetermined period.

1-3. Configuration of Server Device

For example, the server device 50 includes a communication unit 52, an information management unit 54, a determination unit 56, and a storage unit 60. For example, the information management unit 54 and the determination unit 56 are implemented when the hardware processor such as the CPU executes a computer program stored in the storage unit 60. These functional units may also be implemented by hardware such as the LSI, the ASIC, the FPGA, and the GPU. Software and hardware may also implement the functional units in cooperation. For example, the storage unit 60 is implemented by the HDD, the flash memory, the RAM, and the like.

The information management unit 54 causes the storage unit 60 to store the position information 32 acquired from the communication unit 24 of the terminal device 10 by the communication unit 52.

The determination unit 56 sequentially selects predetermined position information from the position information stored in the storage unit 60 (hereinafter, referred to as position information 62) as interest position information. The determination unit 56 then determines whether relation between the interest position information and the prior or posterior position information in time series satisfies the predetermined criterion, and determines whether to hold the interest position information based on the determination result. The details of the process performed by the determination unit 56 will be described below.

1-4. Process Performed by Determination Unit

The process performed by the determination unit 56 will now be described. FIG. 3 is a diagram for explaining a process performed by the determination unit 56 (first example). It is assumed that the position information 62 includes position information (position IDs 1 to 5). For example, the determination unit 56 selects the interest position information, the prior position information immediately prior to the interest position information, and the posterior position information immediately posterior to the interest position information. The prior position information, instead of being position information immediately prior to the interest position information, may be position information acquired before the interest position information but one or more. The posterior position information, instead of being position information immediately posterior to the interest position information, may be position information acquired after next the interest position information or after.

For example, the determination unit 56 selects the position ID 2 as the interest position information (in the diagram, c: current), the position ID 1 as the prior position information (in the diagram, b: before), and the position ID 3 as the posterior position information (in the diagram, a: after) at the first process among the repeatedly performed processes.

For example, when determining to hold the interest position information in the first process, the determination unit 56 selects the position ID 3 as the interest position information, the position ID 2 as the prior position information, and the position ID 4 as the posterior position information in the second process. For example, when determining to hold the interest position information in the second process, the determination unit 56 selects the position ID 4 as the interest position information, the position ID 3 as the prior position information, and the position ID 5 as the posterior position information in the third process.

Figure 4:
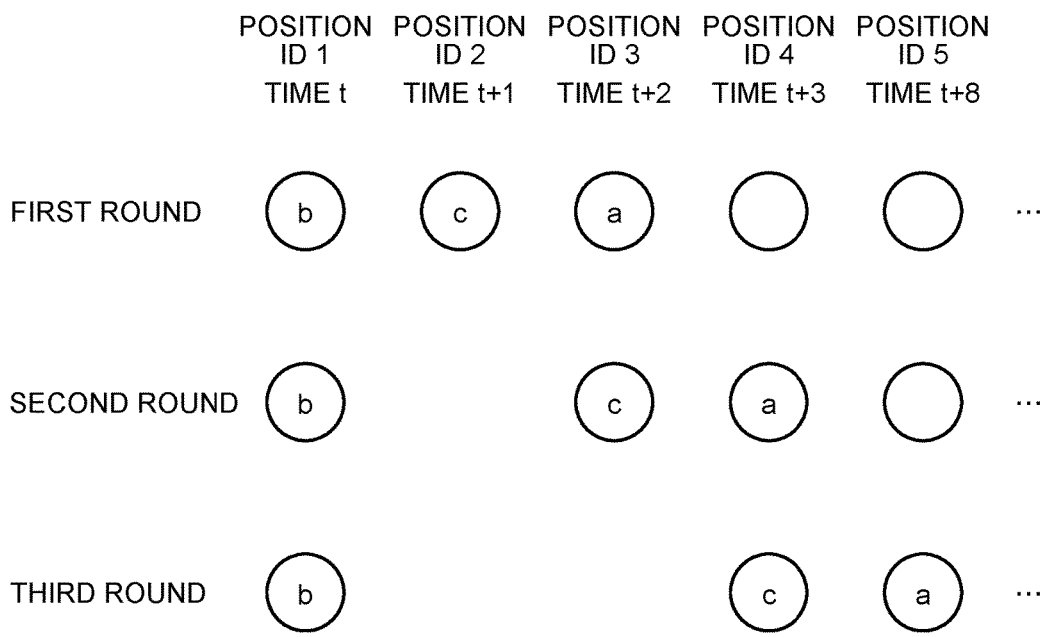
FIG. 4 is a diagram for explaining a process performed by the determination unit 56 (second example)

FIG. 4 is a diagram for explaining a process performed by the determination unit 56 (second example). Differences from FIG. 3 will now be described. For example, when determining not to hold the interest position information in the first process, the determination unit 56 selects the position ID 3 as the interest position information, the position ID 1 as the prior position information, and the position ID 4 as the posterior position information in the second process. For example, when determining not to hold the interest position information in the second process, the determination unit 56 selects the position ID 4 as the interest position information, the position ID 1 as the prior position information, and the position ID 5 as the posterior position information in the third process. When the interest position information is the first and last position information on the position information 62, the interest position information will be held.

In this manner, when determining not to hold the interest position information, the determination unit 56 does not change the prior position information to the other position information in the next process.

1-5. Details of Process Performed by Determination Unit

Figure 5:
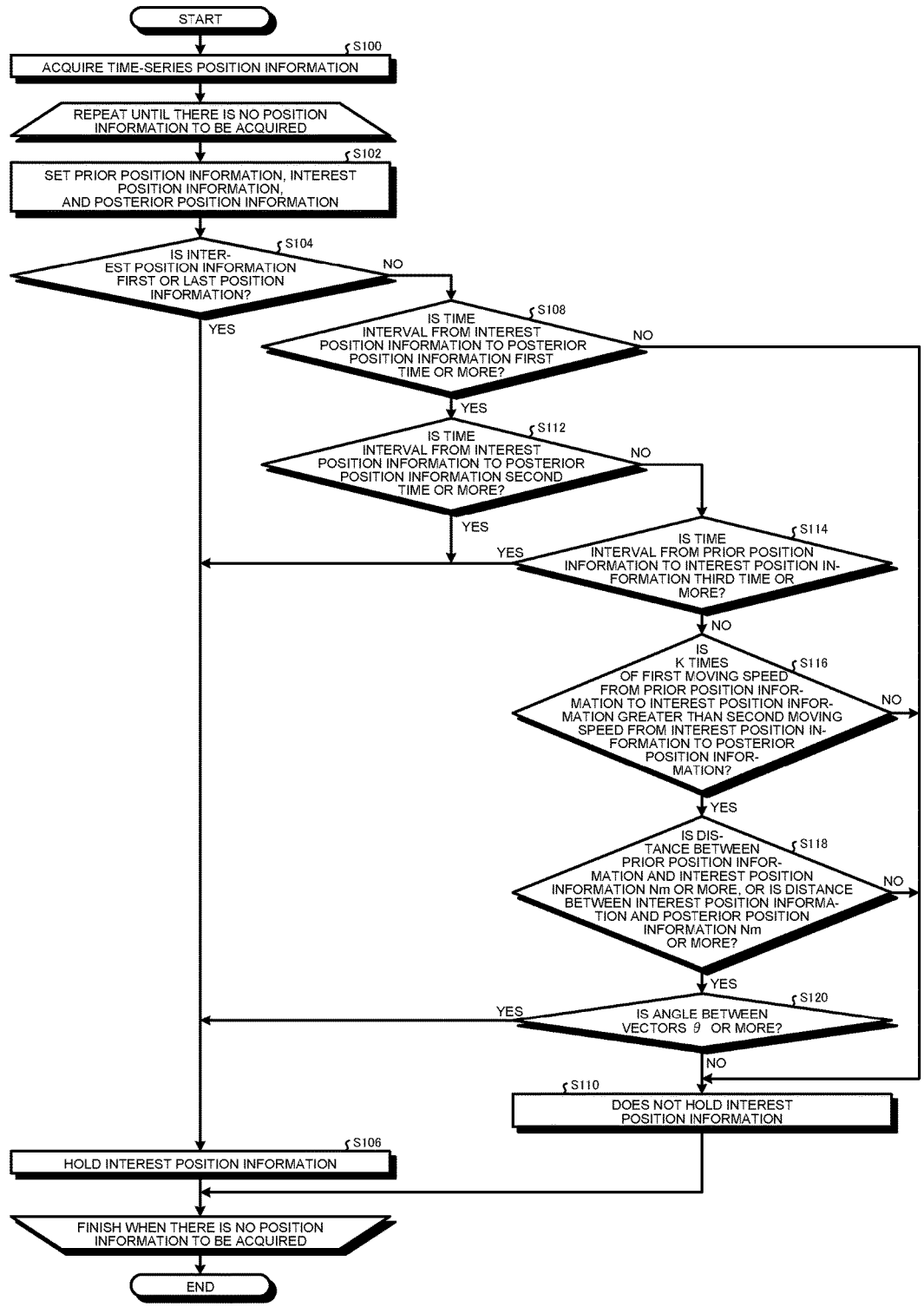
FIG. 5 is a flowchart illustrating a flow of processing executed by a server device 50.

FIG. 5 is a flowchart illustrating a flow of processing executed by the server device 50. It is to be noted that the process sequence in the present flowchart is merely an example, and the process sequence may be optionally changed. Moreover, as described below, an optional process in the processes may be omitted.

First, the determination unit 56 acquires the position information 62 stored in the storage unit 60 (S100). The server device 50 repeats the following processes until there is no position information to be acquired.

As described above, the determination unit 56 sets the prior position information, the interest position information, and the posterior position information according to the time series (S102). Next, the determination unit 56 determines whether the interest position information is the first or last position information in the time-series position information (S104). When the interest position information is the first or last position information, the determination unit 56 determines to hold the interest position information (S106).

When the interest position information is not the first or last position information, the determination unit 56 determines whether the time interval from the interest position information to the posterior position information is the first time or more (S108). When the time interval from the interest position information to the posterior position information is below the first time, the determination unit 56 determines not to hold the interest position information (S110).

When the time interval from the interest position information to the posterior position information is the first time or more, the determination unit 56 determines whether the time interval from the interest position information to the posterior position information is the second time or more (S112). For example, the second time is longer than the first time. When the time interval from the interest position information to the posterior position information is the second time or more, the process proceeds to step S106.

When the time interval from the interest position information to the posterior position information is below the second time, the determination unit 56 determines whether the time interval from the prior position information to the interest position information is the third time or more (S114). For example, the third time is longer than the first time. For example, the third time may also be the same length as the second time. When the time interval from the prior position information to the interest position information is the third time or more, the process proceeds to step S106.

As S108, S112, or S5114 described above, when the time interval between the interest position information and the prior or posterior position information in time series is a predetermined time or more, the interest position information will be held. This is because it is assumed that the moving degree of the terminal device 10 is a predetermined degree or more, and the importance of the position information is relatively high. Alternatively, when the time interval between the interest position information and the prior or posterior position information in time series is less than a predetermined time, the interest position information will not be held. This is because it is assumed that the moving degree of the terminal device 10 is less than a predetermined degree, and the importance of the position information is relatively not high.

When the time interval from the prior position information to the interest position information is below the third time, the determination unit 56 determines whether K times of the first moving speed from the prior position information to the interest position information is greater than the second moving speed from the interest position information to the posterior position information (S116). The first moving speed is the moving speed based on the time interval and the distance between the prior position information and the interest position information. The second moving speed is the moving speed based on the time interval and the distance between the interest position information and the posterior position information. "K" is any natural number.

When K times of the first moving speed is the second moving speed or less, the process proceeds to step S110.

As S116 described above, when a change degree of the second moving speed is greater than that of the first moving speed, the interest position information is assumed as noise. Thus, the interest position information will not be held.

When K times of the first moving speed is greater than the second moving speed, the determination unit 56 determines whether a distance between the prior position information and the interest position information is N1 [m] or more, or a distance between the interest position information and the posterior position information is N2 [m] or more (S118). "N1" and "N2" are any desired natural numbers. "N1" and "N2" may be the same value or may be different values. When both conditions are not satisfied in the process at S118, the process proceeds to S110.

As S118 illustrated above, when the distance between the interest position information and the prior or posterior position information in time series is below a predetermined distance, the interest position information will not be held. This is because it is assumed that the moving degree of the terminal device 10 is less than a predetermined degree, and the importance of the position information is relatively low. Alternatively, when the interval between the interest position information and the prior or posterior position information in time series is a predetermined distance or more, the interest position information will be held. This is because it is assumed that the moving degree of the terminal device 10 is a predetermined degree or more, and the importance of the position information is relatively high.

When at least one of the conditions is satisfied in the process at S118, the determination unit 56 determines whether the angle between vectors, which will be described in detail below, is equal to or more than θ (S120). When the angle between the vectors is below θ, the process proceeds to S110, and when the angle between the vectors is equal to or more than θ, the process proceeds to S106. When there is no more position information to be acquired, the first routine of the present flowchart will be finished.

When the process for determining whether to hold the interest position information is performed as described above, it is possible to acquire more accurate and meaningful position information.

Figure 6A:
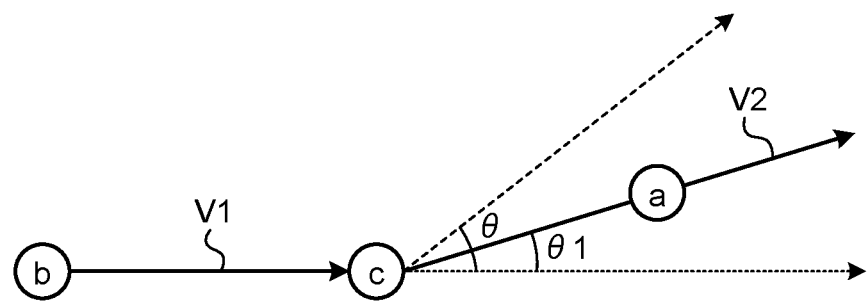
FIGS. 6A and 6B are diagrams each explaining an angle between vectors.

The angle between the vectors will now be described with reference to FIGS. 6A and 6B. As illustrated in FIG. 6A, in the process at S120, when an angle θ1 between a vector V1 directing from the prior position information toward the interest position information and a vector V2 directing from the interest position information toward the posterior position information is less than θ, it is possible to assume the interest position information as noise. Consequently, the interest position information will not be held.

Figure 6B:
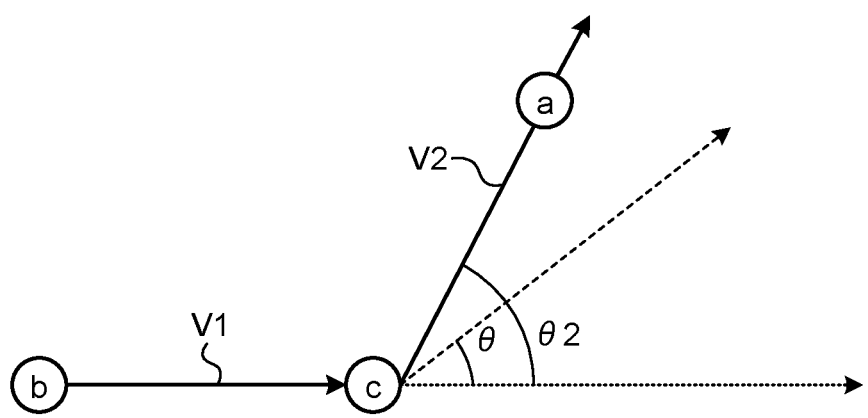

On the other hand, as illustrated in FIG. 6B, in the process at S120, when an angle θ2 between the vector V1 directing from the prior position information toward the interest position information and the vector V2 directing from the interest position information toward the posterior position information is equal to or more than θ, it is assumed that the terminal device 10 is moving a predetermined degree or more. Consequently, the interest position information will be held.

The processes (processes from S102 to S120) in the flowchart explained in FIG. 5 described above may also be applied to the time-series position information (for example, position information 1 to N) for a plurality of times. FIG. 7 is a diagram illustrating an example of the contents of position information when a process of the first to third routines is performed on the position information at position IDs 1 to N. For example, when the process of the first routine on the position information is executed at the position IDs 1 to N, and it is determined not to hold the position ID 2, the processing target of the second routine is the position information excluding the position ID 2. When the process of the second routine is executed on the position information excluding the position ID 2, and it is determined not to hold the position ID 3, the processing target of the third routine is the position information excluding the position ID 3 in addition to the position ID 2. When the process of the third routine is executed on the position information excluding the position ID 2 and the position ID 3, and it is determined not to hold the position ID 5, the position information to be held in the end will be position information excluding the position ID 5 in addition to the position ID 2 and the position ID 3, among the position IDs 1 to N.

1-6. Omission of Determination Process in Each Routine

Among the determination processes (processes at S108 and S112 to S120) of the flowchart described in FIG. 5, a part of the processes may be omitted every time the routine is repeated. Moreover, the determination process for omitting a part of the processes may differ in each routine. For example, when three routines from the first to third rounds are performed, the processes in each routine may be changed as described below.

For example, in the second-round routine, in the determination processes at S116 and S118, one or both of the determination processes may be omitted. Moreover, for example, in the third-round routine, only the determination process at S118 may be performed.

In the flowchart of FIG. 5, the determinations of the time, the speed, and the angle (determinations at S108, S112 to S116, and S120) may be performed before the determination of the distance (determination at S118). The determination of the speed (determination at S116) may be performed before the other determinations.

1-7. Conclusion

With the first embodiment described above, it is possible to properly sort the position information, by determining whether relation between one or more pieces of interest position information included in the time-series position information acquired from the terminal distance and the prior or posterior position information in time series satisfies the predetermined criterion, and determining whether to hold the position information on the basis of the determination result.

2. Second Embodiment

The second embodiment shows a reverse tendency to the first embodiment in the determination of the angle. However, when predetermined POI data is present within a predetermined range from the coordinates of the position information, the position information is held even when the angle does not satisfy the predetermined criterion. Hereinafter, differences from the first embodiment will be described.

2-1. Configuration of Information Processing System in the Second Embodiment

Figure 8:
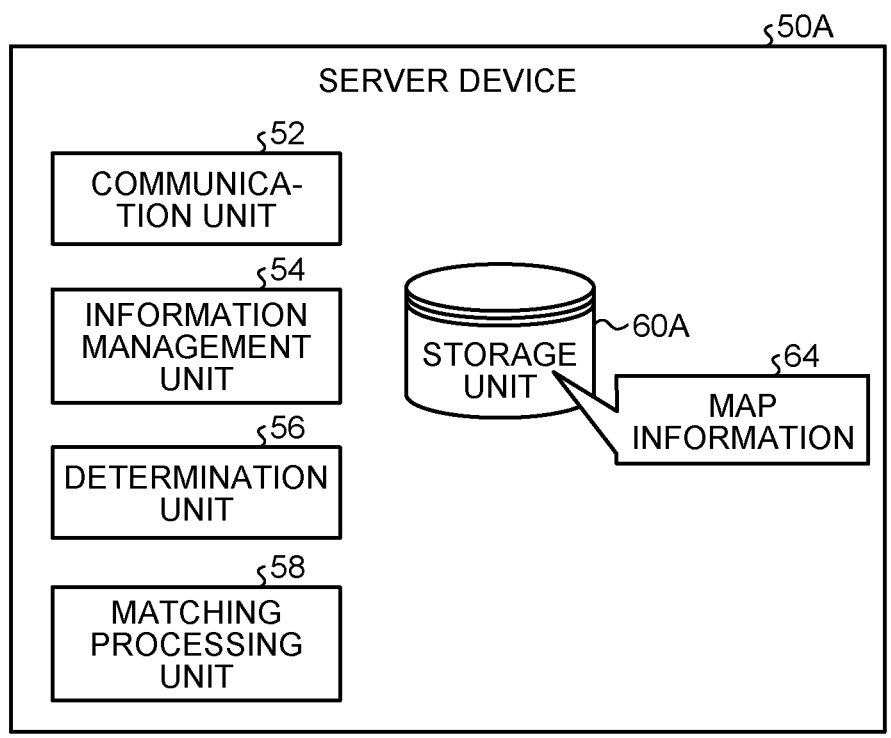
FIG. 8 is a diagram illustrating a functional configuration of a server device 50A included in an information processing system 1A of a second embodiment.

FIG. 8 is a diagram illustrating a functional configuration example of a server device 50A included in an information processing system 1A of the second embodiment. The server device 50A includes a storage unit 60A instead of the storage unit 60 of the server device 50 in the first embodiment. The storage unit 60A stores therein map information 64. For example, the map information 64 includes point of interest (POI) data indicating a specific place on the ground (for example, a station, a restaurant, a shop, an amusement park, an aquarium, a movie theatre, a park, and a vending machine), and information indicating the coordinates according to the POI data. The specific place is an example of a "known specific location".

Moreover, in addition to the functional configuration of the server device 50, the server device 50A further includes a matching processing unit 58. The matching processing unit 58 searches the map information 64 using the coordinates according to the position information stored in the storage unit 60A, and determines whether predetermined POI data is present around the coordinates. The matching processing unit 58 then outputs the determination result to the determination unit 56.

The determination unit 56 determines whether to hold the target position information on the basis of the processing result of the matching processing unit 58.

2-2. Flowchart of Second Embodiment

Figure 9:
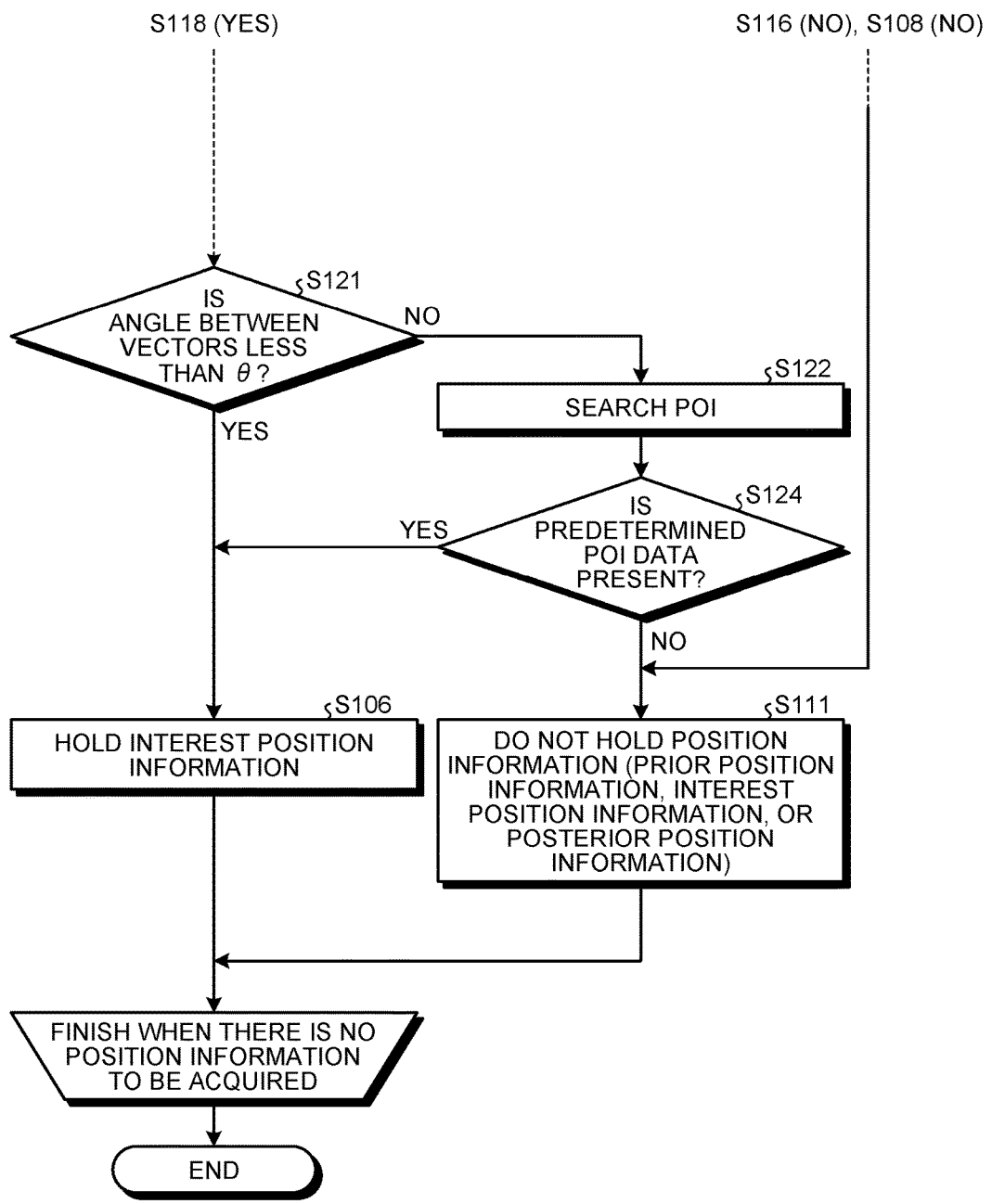
FIG. 9 is a flowchart illustrating a part of the process flow in the second embodiment.

FIG. 9 is a flowchart illustrating a part of the process flow in the second embodiment. Because S100 to S118 in the flowchart of FIG. 9 are the same as S100 to S118 of FIG. 5, the illustration and explanation thereof will be omitted.

In the flowchart of FIG. 9, a process of S121 will be performed instead of S120 in the flowchart of FIG. 5. At S121, the determination unit 56 determines whether an angle between vectors is less than θ (S121). The angle between the vectors is an angle between a vector directing from the prior position information toward the interest position information, and a vector directing from the interest position information toward the posterior position information. "θ" at S121 and "θ" at S120 in FIG. 5 may be the same angle or different angles.

When the angle between the vectors is less than θ, the determination unit 56 holds the interest position information (S106). This is because deviation is not generated between the interest position information and the prior or posterior position information, the interest position information will be held. When the angle between the vectors is not less than θ (when it is equal to or more than θ), the matching processing unit 58 searches the POI data of the map information 64 using the coordinates of the posterior position information (S122). Next, the matching processing unit 58 determines whether predetermined POI data is present within a predetermined range from the coordinates of the posterior position information (S124).

When predetermined POI data is present within a predetermined range from the coordinates of the posterior position information, the process proceeds to S106. When predetermined POI data is not present within a predetermined range from the coordinates of the posterior position information, the determination unit 56 determines not to hold the position information (S111). The position information determined not to be held at S111 is one or more pieces of position information among the prior position information, the interest position information, and the posterior position information. For example, when the angle between the vectors is equal to or more than θ, the posterior position information is assumed as an outlier and may not necessarily be held. Consequently, the first routine of the present flowchart will be finished.

The position information determined not to be held at S111 may also be changed according to the contents of the prior determination process. For example, the determination unit 56 may determine not to hold the interest position information at S111, when the determination at S108 or S116 is negative. For example, the determination unit 56 may determine not to hold the posterior position information at S111, when the determination at S124 is negative.

In the flowchart of FIG. 9 described above, the process proceeds to S111 when the determination result at S108 and S116 is negative. Alternatively, the process may proceed to S122 when the determination result at S108 or S116 is negative.

2-3. Conclusion

In the second embodiment described above, even when it is determined that the position information does not satisfy the predetermined criterion, the position information is determined to be held assuming that the predetermined condition has been met when predetermined POI data is present within a predetermined range from the position information. As a result, it is possible to prevent the position information, which is not a real outlier, from being excluded as an outlier.

3. Third Embodiment

In a third embodiment, the predetermined criterion is a criterion indicating that deviation is not generated between the interest position information and the prior or posterior position information. Moreover, even when it is determined that the position information does not satisfy the predetermined criterion, the determination unit 56 does not exclude the position information when the position information satisfies a predetermined condition in which the position information is assumed as an exception. Hereinafter, the details will be described.

3-1. First Process Performed by Determination Unit

As an example that no deviation is generated between the interest position information and the prior or posterior position information, the determination unit 56 determines whether the interest position information is deviated from a reference locus that is obtained from the time-series position information, for a predetermined degree or more.

Figure 10A:
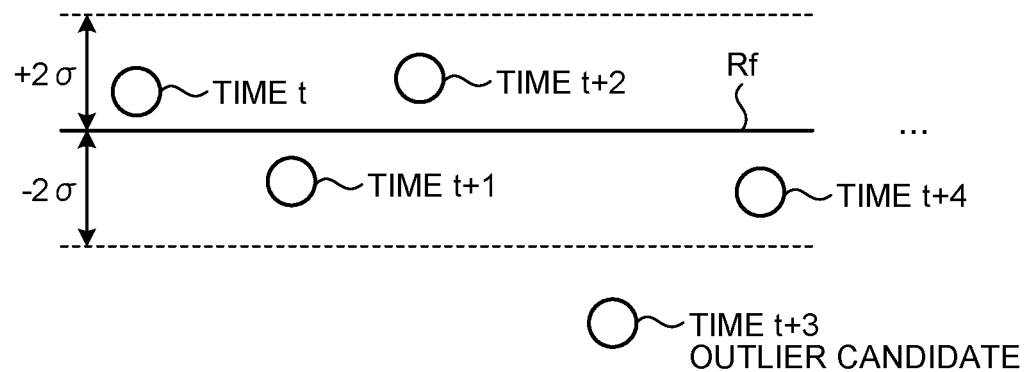
FIGS. 10A and 10B are diagrams each explaining a process performed by the determination unit 56 in a third embodiment (first example)
Figure 10B:
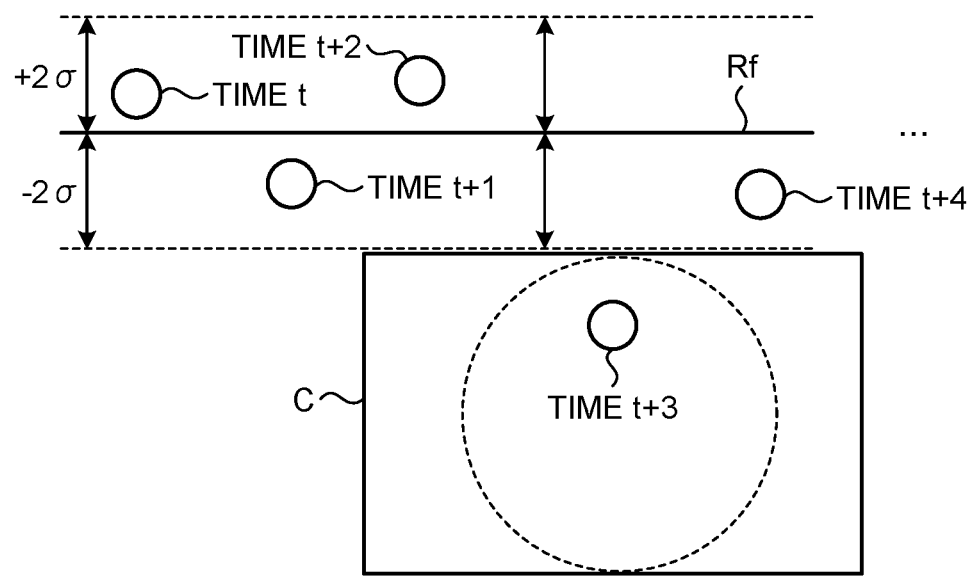

FIGS. 10A and 10B are diagrams each explaining a process performed by the determination unit 56 in the third embodiment (first example). For example, the determination unit 56 derives a reference locus Rf obtained by performing regression analysis such as a least-squares method, on the time-series position information (position information from time t to time t+4). When the position information is deviated from the calculated reference locus Rf for a predetermined degree or more (when the shortest distance of the position information from the reference locus Rf is deviated a predetermined degree or more), the determination unit 56 determines that the position information does not satisfy the predetermined criterion and sets the position information as an outlier candidate. For example, the predetermined degree is obtained by calculating the standard deviation of deviations of pieces of position information from the reference locus Rf, and the deviation between the interest position information and the reference locus is equal to or more than plus and minus 2σ. "σ" is the standard deviation.

The determination unit 56 then inquires the matching processing unit 58 whether a predetermined location is present within a predetermined range from the outlier candidate. The determination unit 56 then acquires the processing result of the matching processing unit 58. When a predetermined location is not present within a predetermined range from the outlier candidate, the determination unit 56 sets the outlier candidate as an outlier.

Alternatively, as illustrated in FIG. 10B, when a predetermined location C is present within a predetermined range from the outlier candidate, the determination unit 56 does not set the outlier candidate as an outlier. This is because when a predetermined location is present within a predetermined range from the outlier candidate, the outlier candidate is not an outlier, but the user may be moving to stop at the predetermined location.

3-2. Second Process Performed by Determination Unit

Figure 11:
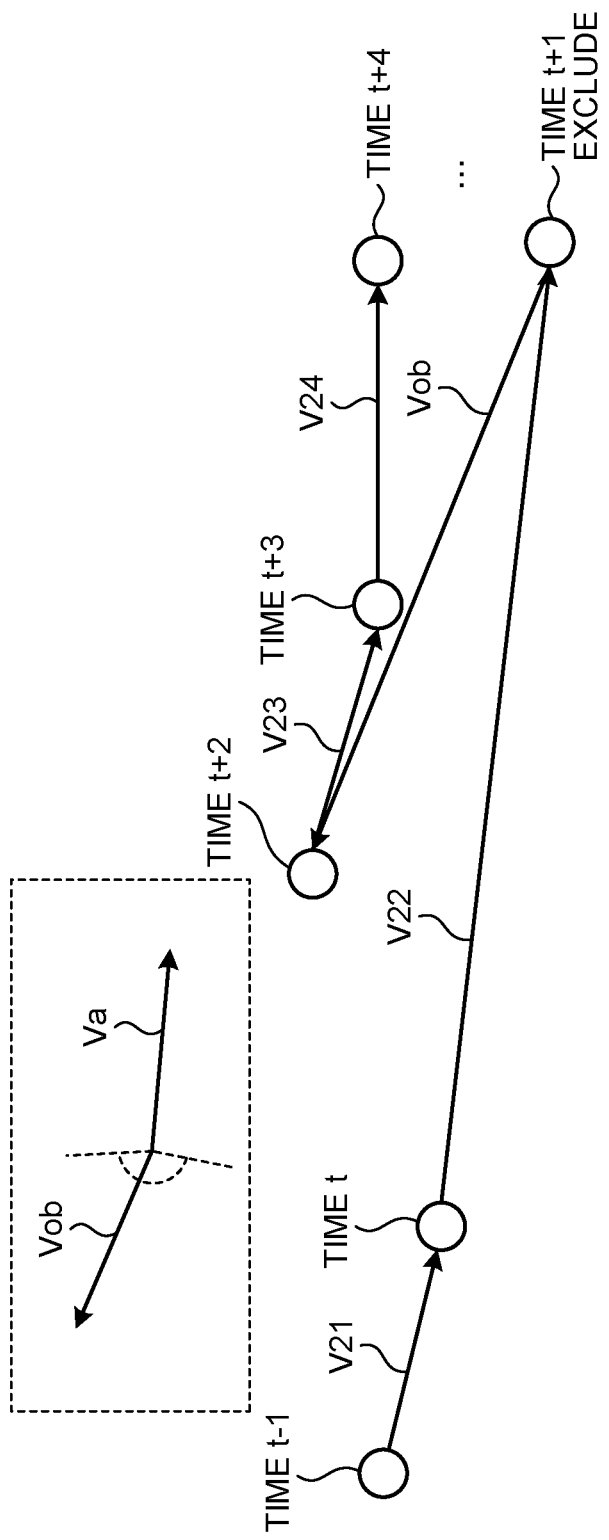
FIG. 11 is a diagram for explaining a process performed by the determination unit 56 in the third embodiment (second example).

FIG. 11 is a diagram for explaining a process performed by the determination unit 56 in the third embodiment (second example). For example, the determination unit 56 selects vectors (V21 to V24) that are temporally before last, last, next, and after next relative to a vector Vob, and when the angle formed with the average vector Va of the vectors is within an angle range set in advance, sets the position information at the base point of the vector Vob as an outlier.

The vector Vob is a vector directing from the interest position information (in this example, position information at t+1) toward the position information immediately posterior to the interest position information (position information at t+2). The vector V21 is a vector directing from the position information at the time t−1 toward the position information at the time t. The vector V22 is a vector directing from the position information at the time t toward the interest position information. The vector V23 is a vector directing from the position information at the time t+2 toward the position information at the time t+3. The vector V24 is a vector directing from the position information at the time t+3 toward the position information at the time t+4.

When a predetermined location described above is present within a predetermined range from the interest position information that is to be excluded as an outlier, the determination unit 56 may also determine that the interest position information is not an outlier.

3-3. Process Performed by Information Management Unit

The information management unit 54 acquires the processing result obtained when the determination unit 56 has performed processing on the time-series position information acquired by a plurality of the terminal devices 10. The information management unit 54 analyzes (integrally processes) the processing result of the determination unit 56, and extracts the position information that commonly becomes an outlier between different terminals and at different times.

The information management unit 54 controls the communication unit 52 so as to send information alerting the presence of the extracted position information that commonly becomes an outlier, to the manager's terminal device, which is not illustrated, used by the manager who manages the server device. In this manner, for example, it is possible to alert the manager and the like.

The information management unit 54 may also send information inquiring the user of the terminal device 10 if the user has actually been to the position information that commonly becomes a common outlier.

When a response is received from the terminal device 10, the information management unit 54 can determine whether the extracted position information that commonly becomes an outlier is a real outlier, or the position information includes position information on a spot where the user may drop by, on the basis of the acquired response information. When it is determined that the position information includes position information on a spot (predetermined location) where the user may drop by, the determination unit 56 determines, when the position information that is suspected as a common outlier appears the next time, that the position information that has appeared is not an outlier. Consequently, the determination unit 56 can more accurately determine whether the position information is an outlier.

3-4. Conclusion

With the third embodiment described above, it is possible to properly sort the position information by excluding the position information as an outlier, when relation between the interest position information and the prior or posterior position information in time series does not satisfy a predetermined criterion.

In the embodiment described above, the server device 50 includes the information management unit 54, the determination unit 56, and the matching processing unit 58. However, the terminal device 10 may include these functional units or these functional units may be dispersedly provided on each device.

In the embodiment described above, the server device 50 determines whether to hold the position information. However, the server device 50 may also determine whether to send the position information to the other device using the position information. In this case, the other device can acquire the sorted position information.

In the embodiment described above, the server device 50 includes the information management unit 54 and the determination unit 56. The information management unit 54 acquires the time-series position information acquired by the terminal device 10. The determination unit 56 determines whether relation between one or more pieces of interest position information that are included in the time-series position information acquired by the information management unit 54 and the prior or posterior position information in time series satisfies a predetermined criterion, and determines whether to hold the interest position information based on the determination result. Consequently, it is possible to properly sort the position information.

In one aspect of the present invention, it is possible to properly sort the position information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
 a processor programmed to:
  acquire time-series position information acquired by a terminal device;
  determine whether relation between one or more pieces of interest position information included in the acquired time-series position information and prior or posterior position information in time series satisfy a predetermined criterion, the predetermined criterion indicating that no deviation is generated between the interest position information and the prior or posterior position information; and
  determine whether to hold the interest position information based on a determination result, wherein:
 upon determining that the predetermined criterion is unsatisfied, the processor does not hold the interest position information.

2. The information processing device according to claim 1, wherein upon determining that the predetermined criterion is unsatisfied, the processor does not hold the interest position information.

3. The information processing device according to claim 1, wherein
 the predetermined criterion includes at least one of:
  a first criterion on a time interval between the interest position information and the prior or posterior position information,
  a second criterion on a distance between the interest position information and the prior or posterior position information,
  a third criterion on moving speed based on the time interval and the distance between the interest position information and the prior or posterior position information, and
  a fourth criterion on an angle between a moving direction toward the interest position information and a moving direction from the interest position information.

4. The information processing device according to claim 1, wherein the processor determines whether a time interval between the interest position information and position information temporally posterior to the interest position information is less than a first time, and when determining that the time interval is less than the first time, determines not to hold the interest position information.

5. The information processing device according to claim 4, wherein the processor determines whether the time interval between the interest position information and the position information temporally posterior to the interest position information is a second time that is longer than the first time or more, and when determining that the time interval is the second time or more, determines to hold the interest position information.

6. The information processing device according to claim 5, wherein when determining that the time interval between the interest position information and the position information temporally posterior to the interest position information is less than the second time that is longer than the first time, the processor determines whether the time interval between the interest position information and position information temporally prior to the interest position information is a third time or more, and when determining that the time interval is the third time or more, determines to hold the interest position information.

7. The information processing device according to claim 1, wherein when first moving speed from the position information temporally prior to the interest position information to the interest position information is less than a criterion relative to second moving speed from the interest position information to the position information temporally posterior to the interest position information, the processor determines not to hold the interest position information.

8. The information processing device according to claim 1, wherein when a distance between the interest position information and the position information temporally prior to the interest position information or a distance between the interest position information and the position information temporally posterior to the interest position information is less than a predetermined distance, the processor determines not to hold the interest position information.

9. The information processing device according to claim 1, wherein the processor determines whether an angle between the moving direction toward the interest position information and the moving direction from the interest position information is less than a predetermined angle, and when the angle being formed is less than the predetermined angle, determines not to hold the interest position information.

10. The information processing device according to claim 1, wherein the processor repeatedly executes a process of selecting interest position information from the time-series position information and determining whether to hold the interest position information for a plurality of times, and omits a part of a determination process in a process of second round and onwards.

11. The information processing device according to claim 1, wherein after determining to hold the interest position information, the processor sets the position information temporally posterior to the interest position information as interest position information to be focused next, determines whether relation between at least the interest position information determined to be held and the interest position information to be focused next satisfies the predetermined criterion, and determines whether to hold the interest position information based on a determination result.

12. The information processing device according to claim 1, wherein after determining not to hold the interest position information, the processor sets the position information temporally posterior to the interest position information as interest position information to be focused next, determines whether relation between at least the position information that is temporally prior to the interest position information determined not to be held and that is determined to be held, and the interest position information to be focused next satisfies the predetermined criterion, and determines whether to hold the interest position information based on a determination result.

13. The information processing device according to claim 1, wherein the predetermined criterion is a criterion in which the interest position information is prevented from being deviated from a reference locus calculated from the time-series position information for a predetermined degree or more.

14. The information processing device according to claim 1, wherein even when the position information is determined to dissatisfy the predetermined criterion, the processor holds the position information when a known specific location is present within a predetermined range from the position information.

15. The information processing device according to claim 14, wherein
the processor acquires the time-series position information obtained by a plurality of the terminal devices, and
the processor determines whether the acquired position information obtained by the plurality of the terminal devices satisfies the predetermined criterion, and
the processor extracts position information that is a common outlier by analyzing the determination result, and that sets the position information that is a common outlier as the known specific location.

16. The information processing device according to claim 15, wherein the processor controls a communication device so as to send information alerting presence of the position information that is a common outlier, to a manager's terminal device managed by a manager who manages the information processing device.

17. The information processing device according to claim 15, wherein the processor controls the communication device so as to send inquiry information for inquiring whether the position information that is a common outlier is an outlier, to the terminal device that has sent the position information.

18. An information processing method causing a computer to perform steps comprising:
acquiring, by the computer, time-series position information obtained by a terminal device;
determining, by the computer, whether relation between one or more pieces of interest position information included in the acquired time-series position information and prior or posterior position information in time series satisfy a predetermined criterion, the predetermined criterion indicating that no deviation is generated between the interest position information and the prior or posterior position information; and
determining, by the computer, whether to hold the interest position information based on a determination result, wherein:
upon determining that the predetermined criterion is unsatisfied, the computer does not hold the interest position information.

19. A non-transitory computer readable storage medium having stored therein a computer program that causes a processor to perform steps comprising:
acquiring, by the processor, time-series position information obtained by a terminal device;
determining, by the processor, whether relation between one or more pieces of interest position information included in the acquired time-series position information and prior or posterior position information in time series satisfy a predetermined criterion, the predetermined criterion indicating that no deviation is generated between the interest position information and the prior or posterior position information; and
determining, by the processor, whether to hold the interest position information based on a determination result, wherein:

upon determining that the predetermined criterion is unsatisfied, the processor does not hold the interest position information.

20. An information processing device, comprising:
a processor programmed to:
   acquire time-series position information acquired by a terminal device;
   determine whether relation between one or more pieces of interest position information included in the acquired time-series position information and prior or posterior position information in time series satisfy a predetermined criterion; and
   determine whether to hold the interest position information based on a determination result, wherein:
the processor determines whether a time interval between the interest position information and position information temporally posterior to the interest position information is less than a first time, and when determining that the time interval is less than the first time, determines not to hold the interest position information,
the processor determines whether the time interval between the interest position information and the position information temporally posterior to the interest position information is a second time that is longer than the first time or more, and when determining that the time interval is the second time or more, determines to hold the interest position information, and
when determining that the time interval between the interest position information and the position information temporally posterior to the interest position information is less than the second time that is longer than the first time, the processor determines whether the time interval between the interest position information and position information temporally prior to the interest position information is a third time or more, and when determining that the time interval is the third time or more, determines to hold the interest position information.

21. An information processing method causing a computer to perform steps comprising:
   acquiring, by the computer, time-series position information obtained by a terminal device;
   determining, by the computer, whether relation between one or more pieces of interest position information included in the acquired time-series position information and prior or posterior position information in time series satisfy a predetermined criterion; and
   determining, by the computer, whether to hold the interest position information based on a determination result, wherein:
the computer determines whether a time interval between the interest position information and position information temporally posterior to the interest position information is less than a first time, and when determining that the time interval is less than the first time, determines not to hold the interest position information,
the computer determines whether the time interval between the interest position information and the position information temporally posterior to the interest position information is a second time that is longer than the first time or more, and when determining that the time interval is the second time or more, determines to hold the interest position information, and
when determining that the time interval between the interest position information and the position information temporally posterior to the interest position information is less than the second time that is longer than the first time, the computer determines whether the time interval between the interest position information and position information temporally prior to the interest position information is a third time or more, and when determining that the time interval is the third time or more, determines to hold the interest position information.

22. A non-transitory computer readable storage medium having stored therein a computer program that causes a processor to perform steps comprising:
   acquiring, by the processor, time-series position information obtained by a terminal device;
   determining, by the processor, whether relation between one or more pieces of interest position information included in the acquired time-series position information and prior or posterior position information in time series satisfy a predetermined criterion; and
   determining, by the processor, whether to hold the interest position information based on a determination result, wherein:
the processor determines whether a time interval between the interest position information and position information temporally posterior to the interest position information is less than a first time, and when determining that the time interval is less than the first time, determines not to hold the interest position information,
the processor determines whether the time interval between the interest position information and the position information temporally posterior to the interest position information is a second time that is longer than the first time or more, and when determining that the time interval is the second time or more, determines to hold the interest position information, and
when determining that the time interval between the interest position information and the position information temporally posterior to the interest position information is less than the second time that is longer than the first time, the processor determines whether the time interval between the interest position information and position information temporally prior to the interest position information is a third time or more, and when determining that the time interval is the third time or more, determines to hold the interest position information.

* * * * *